United States Patent [19]

Freeman

[11] Patent Number: 4,680,117
[45] Date of Patent: Jul. 14, 1987

[54] YOGURT SEPARATOR DEVICE

[75] Inventor: Richard B. Freeman, Gainesville, Fla.

[73] Assignee: The Gainesville 1920 Corporation, Gainesville, Fla.

[21] Appl. No.: 788,865

[22] Filed: Oct. 18, 1985

[51] Int. Cl.[4] ............................................. B01D 23/28
[52] U.S. Cl. ..................................... 210/469; 210/474; 210/484; 210/497.3; 210/502.1; 99/496; 99/508
[58] Field of Search ................. 99/452, 456, 496, 506, 99/508; 426/478, 491, 495, 583; 210/469, 474, 475, 477, 478, 484, 488, 497.01, 497.1, 497.2, 497.3, 502.1, 503

[56] References Cited

U.S. PATENT DOCUMENTS

| | | | |
|---|---|---|---|
| 185,866 | 1/1877 | More | 210/474 |
| 752,019 | 2/1904 | Adwen | 210/474 |
| 956,332 | 4/1910 | Fuller | 210/474 |
| 1,028,114 | 6/1912 | Holton | 210/474 |
| 1,042,317 | 10/1912 | Case | 210/474 |
| 1,081,574 | 12/1913 | Boeck | 210/474 |
| 3,419,151 | 12/1968 | Smith et al. | 210/474 |
| 3,861,975 | 1/1975 | Häuslein | 210/474 |
| 4,321,139 | 3/1982 | Auclair | 210/474 |

Primary Examiner—Richard V. Fisher
Assistant Examiner—Wanda L. Millard
Attorney, Agent, or Firm—Isler and Ornstein

[57] ABSTRACT

A yogurt separator device having in one form a flat blank of filter mesh made of synthetic resin and having openings of from 200 microns to 400 microns in size. The blank being formable into a yogurt-receiving container for separating the whey from the yogurt, and utilizing secured overlapping edge portions to maintain its container shape. In a modified form, a substantially similar blank made of liquid-impervious, resilient and flexible synthetic resin is formable into an external container for the filter mesh to provide a composite container which can be disassembled to flat form for re-use.

5 Claims, 9 Drawing Figures

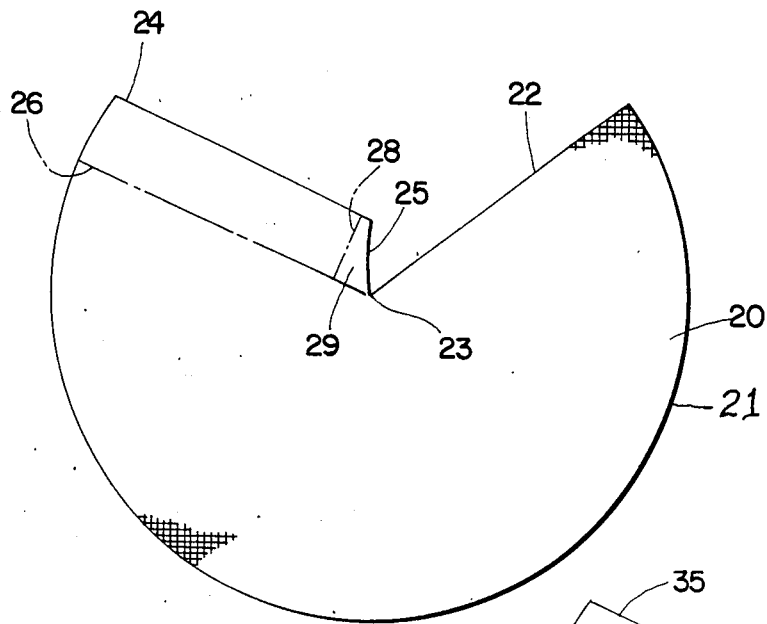
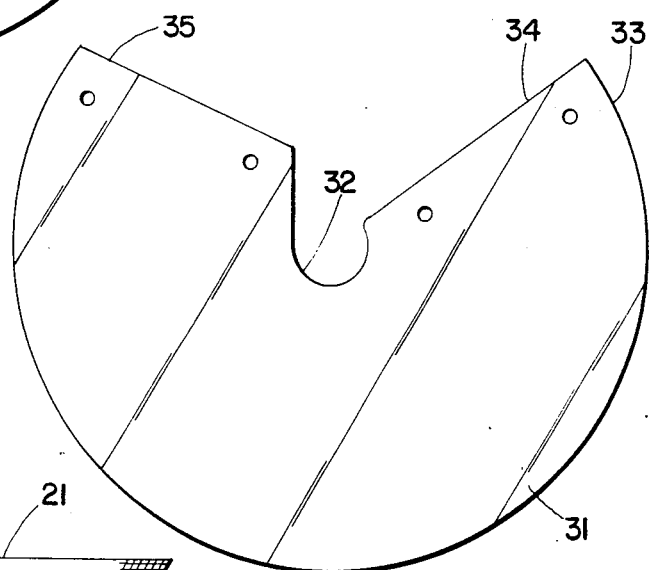
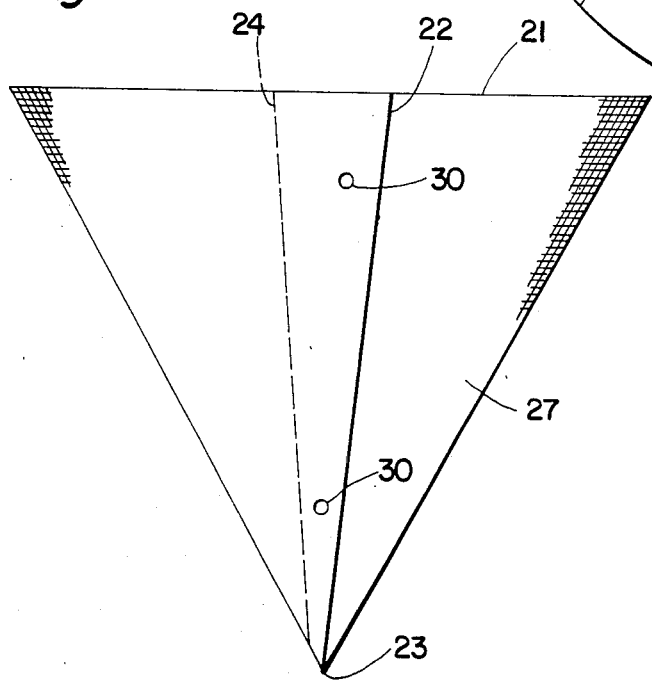

YOGURT SEPARATOR DEVICE

BACKGROUND OF THE INVENTION

The invention relates to a separator device for conveniently separating or removing the whey from yogurt to create a cheese-like residue which is palatable and nutritionally desirable as a food.

It has long been known that a cheese-like food can be formed from yogurt by removing the whey from the yogurt to leave a solid residue which has a spreadable consistency comparable to that of cream cheese.

The removal of the whey is accomplished by folding several layers of cheesecloth or muslin or similar coarsely-woven material of natural fibers to form a filter element upon which the yogurt is placed. The whey slowly drains into a colander or strainer leaving the desired semi-solid residue which has to be removed from the cloth filter.

There are several drawbacks to the "cheesecloth" procedure described above. One of these is the adherence of the residue to the cloth fibers which makes it difficult to remove residue and results in considerable waste or loss of residue which cannot be conveniently recovered. This same factor also makes it necessary to either discard the filter cloth or thoroughly launder it before re-use, as scraping plus rinsing is insufficient to adequately remove the adherent residue. Even laundering fails to completely remove all of the residue, thereby resulting in a undesirable odor in the cloth after it sets awhile.

Another problem is the unduly large amount of space occupied by the whey collection bowl and the cheesecloth, due to the necessity of suspending the cloth over the bowl. This is a particular disadvantage when the whey separation takes place inside a refrigerator, as is often recommended, but where space is at a premium.

However, the most serious disadvantage is the loss of calcium from the residue. When coarse mesh, such as layered cheesecloth, is utilized as a filter for yogurt, there is a tendency for a significant amount of the calcium to drain out with the whey. This can be observed as a white substance or residue in the drained whey, which clouds it. A clear whey fluid indicates that there has been no such nutrient loss. Inasmuch as one of the stated advantages of eating yogurt residue is to enhance calcium intake, particularly for older women who are subject to osteoporosis, it is evident that the loss of calcium, through use of the conventional cheesecloth whey-separation procedure, is inimical to obtaining the desired benefits from eating this food.

SUMMARY OF THE INVENTION

It is the primary object of the invention to provide an improved device for separating whey from yogurt.

Another object of the invention is to provide a device of the character described which effectively minimizes any significant retention of calcium in the drained whey.

A further object of the invention is to provide a device of the character described which is readily cleaned for re-use.

Still another object of the invention is to provide the above-described device in an easily-stored flat or planar form for temporary re-formation into an operative, compact form whenever the yogurt separating function is to be utilized.

An additional object of the invention is to provide a device of the character described which utilizes two layers of materials, having diverse characteristics, which are integrated with each other to improve the convenience, quality and speed of the yogurt separation process.

Other objects and advantages of the invention will become apparent during the course of the following description and with reference to the following drawings in which like numerals designate like parts throughout the same.

BRIEF DESCRIPTION OF THE DRAWING

FIG. 1 is a plan view of the mesh filter element of the yogurt separator device in the un-formed, un-assembled condition.

FIG. 2 is a view in elevation of the filter of FIG. 1 formed and maintained in yogurt-receiving container shape, here shown as a cone.

FIG. 3 is a plan view of the backing element of the device in the un-formed, un-assembled condition.

DESCRIPTION OF THE PREFERRED EMBODIMENTS

Figure 4:
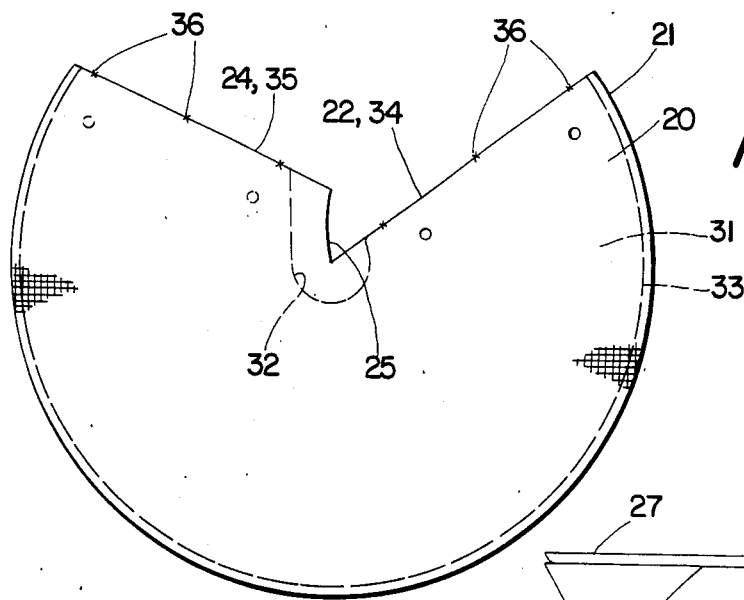
FIG. 4 is a plan view of the filter of FIG. 1 assembled to the backing element of FIG. 3 before being formed into an operative or container shape, portions only of the spaced filaments of the screen mesh being shown.

Referring more particularly to the drawings, there is shown in FIGS. 1 and 2 a non-rigid mesh filter element 20 formed of woven synthetic resin material to produce a fine mesh screen having openings which are preferably not less than 200 microns or more than 400 microns in size.

The resin may be in the form of mono-filaments, multifilaments or spun yarn and may, for example, be a nylon, a polypropylene, a polyethylene or an acrylic, with nylon being preferred because it is somewhat more moisture-absorbent than the other named synthetic resins. This characteristic is utilized to enhance the rate of separation of the whey from the yogurt, as will be more fully explained hereinafter.

It will be noted that, in FIG. 1, the filter element is shown in the form of an un-formed blank having an arcuate periphery 21 extending through an arc of about 220° and terminating at one end in a substantially linear, radially-extending edge 22 which extends from the periphery 21 to the nominal center 23 of the circular arc. The other end of the arc 21 terminates in a substantially linear, chordally-extending edge 24 which is offset from the center 23, but has a radially-directed extension 25 intersecting the opposed edge 22 at the center 23. As shown in FIG. 1, the filter element blank is of a configuration which will form into a cone, but it will be understood that the configuration need not be limited to forming a cone, but may be of such shape as will provide other suitable tapered container forms, although the conical form is preferred.

The phantom line 26 in FIG. 1 provides an indication of the extent of overlap which is desirably achieved when the opposed edges 22 and 24 are drawn toward each other to form the conical container member 27 shown in FIG. 2. The second phantom line 28 shown in FIG. 1 indicates an area of tongue 29 of the filter adjacent the edge 24 which creates a double layer of mesh at the apex 23 of the filter element to effectively minimize any tendency in the formation of the container 27 to leave any unobstructed opening at the apex.

Figure 7:
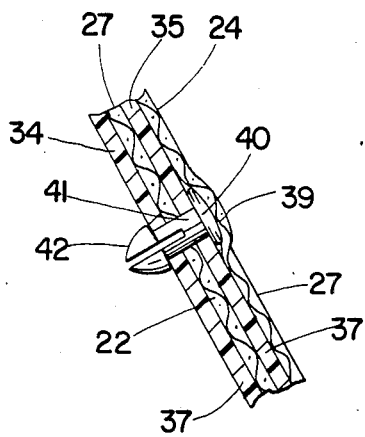
FIG. 7 is an enlarged fragmentary cross-sectional view taken as indicated on line 7—7 of FIG. 5, showing one form of releasable securement for the device.
Figure 8:
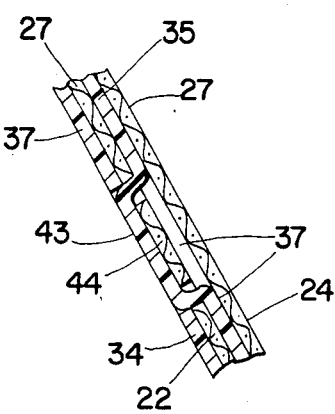
FIG. 8 is a view similar to FIG. 7, but showing a modified form of releasable securement.
Figure 9:
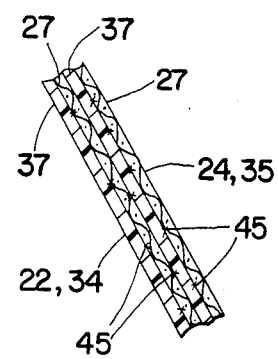
FIG. 9 is a view similar to FIG. 7, but showing another modified form of securement for the device.

As shown in FIG. 2, the edge portions 22 and 24 of the screen are moved into overlapping relationship to form the conical yogurt-receiving filter cup or container 27 and the edge portions can then be secured to each other permanently or releasably, as desired, as indicated by the fastenings 30. The fastenings may, for example, be friction-type fasteners, such as snaps or expansion pins, if they are to be releasable, or they may be rivets, adhesives, or heat bonds, for example, if they are to be permanent. Any suitable securement may be utilized, as long as it will not contaminate the yogurt. Various forms of securement are also shown in FIGS. 7-9 of the drawing.

The container 27 has a mesh opening size which is approximately 15-20 times smaller than that of cheesecloth or muslin, thus minimizing calcium loss. The filter element need not be suspended above a whey collector vessel, as is done in the "cheesecloth" procedure; the mesh container 27 can be placed on and supported directly by the rim of any suitably-sized whey collector jar or vessel (not shown), with the apex 23 extending partially into such vessel. More importantly, the yogurt residue can easily be removed from the synthetic resin filter screen and the filter can then readily be rinsed and cleaned for re-use without the necessity for scraping or extensive laundering, as is the case with cheesecloth.

If desired, the filter may be retained in container form for subsequent re-use. However, when the securement 30 is of the releasable type, the overlapping edge portions 22 and 24 may easily be disconnected and the filter element restored to the flat form of FIG. 1 for convenient and compact storage, and then re-assembled for re-use.

Referring now to FIGS. 3-6 of the drawing, I have shown a modified and improved form of the invention in which a backing element 31 of liquid-impervious synthetic resin, such as for example, high-density polypropylene or polyethylene sheet in flexible, resilient, semi-rigid, self-sustaining form is utilized with the filter element 20 to form an integrated composite container.

Figure 5:
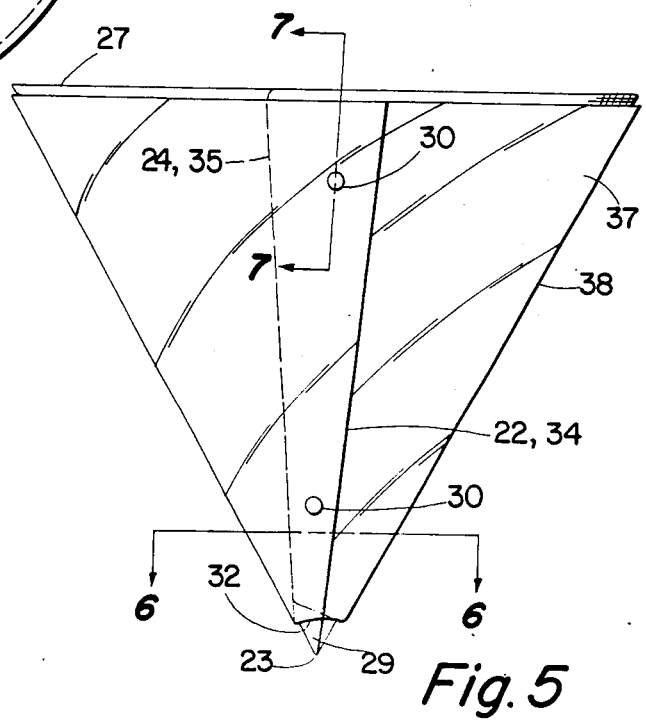
FIG. 5 is a view in elevation of the assembly of FIG. 4 formed into an operative shape, here shown as a cone by way of example.

As illustrated in FIG. 3, the backing element 31 has a configuration in blank form which is substantially the same as that of the filter element 20, except for an enlarged central apex opening 32 around the nominal center 23 which is of a size to receive the bottom tip of the filter cup 27 (see FIG. 5).

The backing element has an arcuate periphery 33, a radially extending edge portion 34, and an opposed edge portion 35 which correspond to and are substantially coincident with the like portions 21, 22, and 24, respectively, of the filter element 20. The portion of the backing element 31 which extends between the opposed edge portions 34 and 35 and which forms the imperforate cone-shaped backing cup 37 is continuous and free of openings radially outwardly of the central opening at the apex.

As shown in FIG. 4, the flat or blank form of the backing element 31 is disposed in underlying, laminar relationship to the filter element 20 and secured thereto, as indicated at 36, at least along the non-deforming edges 22, 34 and 24, 35, by heat-bonding, stitching, adhesive or the like. Under some circumstances, the aforesaid securement may also be required along the deformed arcuate edges 21 and 33, but it is preferred that the filter element 20 be free of the backing element 31 along the arcuate edge portions.

Figure 6:
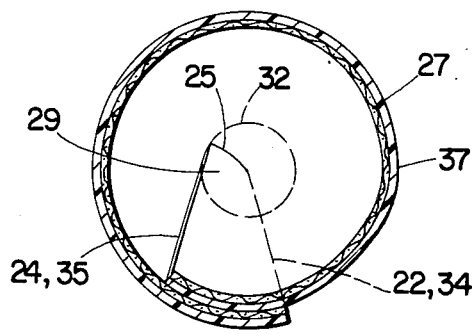
FIG. 6 is an enlarged fragmentary cross-sectional view, taken as indicated on line 6—6 of FIG. 5.

As shown in FIGS. 5 and 6, the secured edge portions 22, 23 and 24, 35 are brought into overlapping relationship to form the previously described filter mesh container 27 internally of an external backing container 37, thus forming the composite container 38. In this structure, the central apex opening 32 of the backing cup or container 37, which receives the bottom tip of the filter cup, is effectively obstructed by the double layer of filter mesh provided by the tongue 29 so that any free-flow opening at the apex is minimized and all the yogurt is subjected to filtration, even at the apex.

The overlapped edge portions of the container 38 are secured to each other by fastenings, as indicated at 30. As previously indicated, the fastenings 30 may be permanent, but preferably are releasable, so that the yogurt separator 38 can be dissembled for convenient cleaning and storage.

In FIG. 7, a frictional form of releasable fastener 39 is illustrated. It has a head portion 40 attached to the underlying edge portion 35 of external container 37 and has a split shank 41 projecting through the edge portions 22, 34 with an enlarged frictionally gripping end 42 which releasably retains the overlapping end portions snugly against each other.

Another form of releasable fastener is shown in FIG. 8, in which the edge portion 35 is slit to form a loop 43 which is frictionally engaged by a tab 44 provided on the overlapping edge portion 34 to hold the parts together.

Other conventional releasable fastenings, for example friction snaps or "Velcro" strips, could also be used, this being essentially a matter of choice as to the particular type of releasable fastening which is utilized.

In FIG. 9, there is shown, by way of example, a permanent fastening in the form of heat bonding 45 between the overlapping edge portions 24, 35 and 22, 34 to effect a non-releasable securement. Other conventional forms of permanent securement, such as stitching, riveting and adhesives may also be utilized.

It should be noted that although the synthetic resin filaments of the fine-mesh screen forming the filter element 20 will not in themselves transmit liquid by a capillary or "wicking" process, the fine mesh does have the ability to produce a thin film of liquid over each opening by surface tension interaction between the whey and the mesh material. This creates a wetting action at the interface between the filter element 20 and the backing element 31 which enhances the rate of drainage and removal of the whey from the yogurt. If the filter material is even slightly absorbent, as in nylon, this wetting action is improved.

In use, the separator device 38 is filled with yogurt, while the device is resting upon a whey collection jar or the like. The parts are then placed in a refrigerator. When the removal procedure for the whey is completed, i.e. when the residue has attained the desired cheese-like consistency, the separator device 38 is removed, the residue is salvaged for use, and the device is cleaned so as to be ready for re-use. It will be noted that, preferably, the filter element 20 can be lifted from the backing element 31, except where the two elements are joined to each other, as indicated at 36. Thus, whether or not the composite container 38 is disassembled to flat form or kept in the deformed state, the filter element 20 can be rinsed and back-flushed for complete removal of any remaining residue. Even when the securement 36 extends around the deformed or arcuate edges 21, 33 of the composite container 38, a complete cleaning of the filter element for re-use is possible by an ordinary pressure rinse, in contrast to the extensive laundering required for cheesecloth, and some degree of back-flushing can be attained by lifting the unsecured portion of the filter element near the opening 32.

One of the additional advantages of utilizing the flexible, resilient backing element 31 is that it resists deformation from its flat form, as in FIG. 3 or 4, to its container form as in FIG. 5. This resistance manifests itself by a reaction or resistance force which urges the inner edge portion 35 of the backing element 31 tightly against its outer overlapping edge portion 22, 34 to seal the overlap area against non-filtered drainage of the yogurt.

It is to be understood that the forms of my invention, herewith shown and described, are to be taken as preferred examples of the same and that various changes in the shape, size and arrangement of the parts may be made without departing from the spirit of the invention or the scope of the subjoined claims.

I claim:

1. In a yogurt separator device for separating and removing the whey from yogurt, the combination of a flexible fine-mesh screen formed of spaced filaments of synthetic resin, said screen being initially of substantially flat or planar form and providing a configuration presenting edge portions opposed to each other; said screen being formable into an operative tapered yogurt-receiving filter cup with a bottom apex by bringing said opposed edge portions into overlapping relationship to each other; means for securing said edge portions against displacement from said overlapping relationship, whereby the whey drains through said cup while the residue is removably retained thereby; a flexible imperforate self-sustaining backing element of synthetic resin having a nominal central apex opening to receive the bottom apex to said filter cup and a configuration in planar form which is generally the same as that of said screen, said backing element being impervious to liquid and disposed in substantially laminar relationship to said screen and having edge portions opposed to each other, the portion of the backing element between the opposed edge portions being continuous and free of openings radially outwardly of said central opening; and second means for securing said backing element to said screen, said backing element being formable into a tapered bottom-opening cup-shaped container member external to said cup by bringing said opposed edge portions of said backing element into overlapping relationship with each other; the mesh openings of said screen having a size in the range of from 200 to 400 microns such that a thin film of liquid is formed over each opening by surface tension interaction between the whey and the synthetic resion of said filaments and a wetting action is created at the interface between the fine-mesh screen and the liquid-impervious backing element.

2. A combination as defined in claim 1, wherein said backing element is liquid-impervious, and the material of said filaments is somewhat moisture-absorbent, whereby there is an increase in surface-tension-reducing wetting action between the interface of said backing element and said filaments to enhance the separation of the whey from the contained yogurt.

3. A yogurt separator device as defined in claim 1 wherein said fine-mesh screen is of a configuration which forms a cone with a central apex, the opposed edge portions of said screen being substantially coincident with said opposed edge portions of said backing element; one of said opposed edge portions of said screen extends radially through said bottom opening in said backing element to said apex; and said other overlapping opposed edge portion has a tongue extending toward said apex in intersecting relationship to said one edge portion to provide a filter mesh across said bottom opening and to prevent unfiltered flow from the bottom portion of said cone, said tongue having a lower edge extending radially to said apex and fitting against the interior surface of said cone.

4. In a separator device for separating and removing the whey from yogurt to form a nutritional cheese-like residue, the combination of a flexible filter formed of spaced monofilaments of synthetic resin material woven to form a fine-mesh screen element with mesh openings of a predetermined size in the range of from 200 to 400 microns; a flexible imperforate backing element of synthetic resin disposed in laminar relationship to said screen element, said backing element and said screen element each being initially of substantially planar form with radially extending edge portions opposed to each other and being of a shape such that, by bringing the opposed edge portions of each of said elements into contiguous relationship, the screen element is formable into an operative tapered yogurt-receiving cup which narrows gradually from a wide opening at the top toward an apex at the bottom, said backing element having a nominal central apex opening and a configuration in planar form which is generally the same as that of said screen element, the portion of the backing element between the opposed edge portions being continuous and free of openings radially outwardly of said central opening; and means for releasably securing the edge portions of said elements in the contiguous cup-forming position; said backing element being liquid impervious and the material of said mono-filaments being somewhat moisture absorbent, whereby there is an increase in surface-tension-reducing wetting action between the interface of said backing element and said screen element to enhance the separation of the whey from the contained yogurt.

5. A yogurt separator device as defined in claim 4 wherein said screen element is made of monofilament nylon.

* * * * *